United States Patent
Benoit

(10) Patent No.: US 8,375,253 B2
(45) Date of Patent: Feb. 12, 2013

(54) DETECTION OF A FAULT BY LONG DISTURBANCE

(75) Inventor: Olivier Benoit, Carnoux en Provence (FR)

(73) Assignee: Gemalto SA, Meudon (FR)

( * ) Notice: Subject to any disclaimer, the term of this patent is extended or adjusted under 35 U.S.C. 154(b) by 1423 days.

(21) Appl. No.: 11/989,101

(22) PCT Filed: Jun. 12, 2006

(86) PCT No.: PCT/EP2006/063091
§ 371 (c)(1),
(2), (4) Date: Jan. 22, 2008

(87) PCT Pub. No.: WO2007/009847
PCT Pub. Date: Jan. 25, 2007

(65) Prior Publication Data
US 2009/0119646 A1    May 7, 2009

(30) Foreign Application Priority Data
Jul. 19, 2005 (FR) .................. 05 52239

(51) Int. Cl.
*G06F 11/00* (2006.01)

(52) U.S. Cl. ......... 714/38.1; 714/25; 714/38.13; 714/48

(58) Field of Classification Search .......... 714/38.1, 714/38.13, 42, 48, 25
See application file for complete search history.

(56) References Cited

U.S. PATENT DOCUMENTS

| 4,387,423 A * | 6/1983 | King et al. ............ 714/34 |
| 5,802,266 A | 9/1998 | Kanekawa et al. |
| 7,006,947 B2 * | 2/2006 | Tryon et al. ........... 702/183 |
| 7,072,291 B1 * | 7/2006 | Jagadeesan et al. ..... 370/216 |
| 2003/0037247 A1 * | 2/2003 | Obara et al. .......... 713/193 |
| 2003/0135789 A1 * | 7/2003 | DeWitt et al. ......... 714/38 |
| 2004/0236875 A1 * | 11/2004 | Jinzaki ............... 710/15 |
| 2006/0005072 A1 * | 1/2006 | Conti et al. .......... 714/5 |
| 2006/0059387 A1 * | 3/2006 | Swoboda et al. ....... 714/30 |
| 2007/0055403 A1 * | 3/2007 | MacDonald et al. ..... 700/108 |

OTHER PUBLICATIONS

Hagai Bar-El et al., "The Sorcerer's Apprentice Guide to Fault Attacks" Workshop on Fault Detection and Tolerance in Cryptography, May 7, 2004, XP002329915.
Anghel L. et al., "Cost Reduction and Evaluation of a Temporary Faults Detecting Technique" IEEE, Mar. 27, 2000, pp. 591-598, XP010377522.
Written Opinion (in French) Application No. PCT/EP2006/063091.

* cited by examiner

*Primary Examiner* — Scott Baderman
*Assistant Examiner* — Sarai Butler
(74) *Attorney, Agent, or Firm* — Buchanan Ingersoll & Rooney PC

(57) ABSTRACT

A method for detecting faults by perturbations during execution of a computerized code in an electronic device. The computer code includes a sensitive process. The method includes a step of executing a redundant procedure of the sensitive process and a step of inserting a delay between the sensitive process and the redundant procedure. A trapping procedure is executed during the delay. The trapping procedure is sensitive to perturbations and supplies, in the absence of perturbation, a predictable result.

15 Claims, 1 Drawing Sheet

DETECTION OF A FAULT BY LONG DISTURBANCE

The present invention relates to the field of detection of faults in an electronic component.

The present invention more particularly relates to a method making it possible to detect faults resulting from a long perturbation.

Chip cards, and more generally speaking, some portable electronic components are often used as a computing and storage unit for secret and/or sensible data with the aim of making an application secure. Identification, mobile telephones, payments, transportation or access controls are some of the fields of application in which chip card plays an essential part.

This part consists among other things and in a non-limitative way, in authenticating the bearer of the card and/or the card issuer. The card can also contain "units" which may correspond to loyalty advantages, money (for example phone taxes) or subway tickets, depending on the application.

Thus, for some malevolent persons or organizations, the card represents a favorite target to defraud or to cast a slur on a company's brand image.

Since its deployment, the card has had to face threats among which the observation of current consumption (side channel analysis) and also, more recently, attacks by injection of transient faults. The detection of such attacks is relatively complex and the answer to such attacks is difficult to implement. The present electronic components are not able to guarantee a correct operation, whatever the external perturbations. The result is that the software or operating system present on the card must protect itself against possible failures of the component generated by an injection of fault at the risk of corruption of sensitive data.

The prior art already knows solutions for detecting perturbations, for example glitches (voltage pulse) which would be likely to cause a fault in the operation of the electronic component. It should be noted that hardware solutions exist, which consist in integrating environmental sensors (temperature, clock frequency, supply voltage, light sensors) which will detect a perturbation (an abnormally low voltage, too high a light intensity) in order to react, before entering into an operation zone of the component which is evaluated as unstable and thus risky, in terms of fault. Such solutions are expensive since they require the development of specific sensors (economical cost) and their integration into circuits which are sometimes of small dimensions (size cost).

Solutions are also known, which detect the effect of the perturbation caused, for example, by the presence of a modified data bit.

Among others, software or hardware solutions of the "redundancy of a process" type exist. Redundancy, in a simplistic way, consists in making the same operation (computing, transmission . . . ) twice, in order to compare the results of both actions. In software mode, redundancy can be a double computing on data. In hardware mode, such redundancy can reveal itself, for example, by the presence of two cleaved registers a priori storing the same values. If the results are different then a reasonable conclusion can be that one of the actions did not go well, probably because of a perturbation (fault).

Software or hardware solutions of the "integrity control" type also exist. A data "checksum" (check sum) is added to data stored in a non volatile memory, such sum making it possible to detect whether data are corrupted by a fault prior to the checking of the checksum, in case of inconsistency between the data and the checksum. The addition of integrity data is current in software layers, for example for the transmission of data. The checksum in hardware, as it is found in the prior art, is implemented at the level of a storage block only, and is often called "Parity Bit". The elementary computer word (8 bits on an 8-bit component) is stored in 9 bits of memory, the 9th bit being a parity bit positioned such that the parity of the word is systematically even/odd. During a reading operation, the parity is checked and the 8-bit word is positioned on the data bus. During a writing operation, the 8-bit word positioned on the data bus is written into the memory and the parity bit is generated at the same time. A problem is that, on the data bus, the transmitted word does not include any integrity data: there is no way to check that this value will still be correct once it is transferred to the memory, the central processing unit CPU or into the cache.

Such solutions are sufficient for "accidental" faults which occur during the execution of a command, for example in the space field, as faults are punctual (pulses) and affect either the data (or sensitive process) or its redundancy or its checksum. It should be noted that any decision or any manipulation of sensitive data or cryptographic computing process can be considered as sensitive. As a non limitative example, the decision process of choosing to accept a command or of choosing to accept a file reading/writing/erasing operation or of choosing to accept a debit or a credit to/from an electronic balance or to compare a secret code or a MAC (Message Authentication Code) can be mentioned.

However, malevolent persons can repeat faults on electronic components and adapt their techniques until they succeed. Thus, it can be considered that the hacker will try to reproduce the same fault both on the sensitive process and on the redundant procedure, such that the fault cannot be detected.

The prior art then knows a solution consisting in inserting, as shown in FIG. 1, a random delay 12 between a sensitive process 10 and its redundancy 11. Such solution significantly increases the resistance of the protection against faults.

However, long physical perturbations 13 can be implemented by hackers on the components, such that the sensitive processes and their redundancy are all perturbed and cannot detect a fault, whatsoever.

Generally speaking, the solutions of the prior art do not make it possible to efficiently face long perturbations which can affect both the sensitive processes and the redundancy data.

The present invention is aimed at remedying the disadvantages of the prior art by providing a method for detecting faults, wherein "trapping" type means are introduced during the delay separating the sensitive process and its redundancy. More particularly, trapping means are sensitive to the same perturbations so as to give indications that these are present.

The method according to the present invention is particularly well-suited for the protection against long perturbations, since the trapping means trace the perturbation information, if the latter concern both the sensitive process and the redundant procedure.

For this purpose, the invention, in its broadest meaning, relates to a method for detecting a fault by perturbations during the execution of a computer code in an electronic device, said computer code comprising a so-called sensitive process, the method including a step of executing a redundant procedure of said sensitive process and a step of inserting a delay between the sensitive process and the redundant procedure, characterized in that it further comprises a step of executing a trapping means during the delay, said means being sensitive to said perturbations and supplying, in the absence of perturbation, a predictable result.

According to the embodiment, said trapping means is a software sensor or a hardware sensor.

In one embodiment, said inserted delay is randomly determined.

In another embodiment, said trapping means is a hardware sensor.

More particularly, said step of executing the trapping means consists in executing, a random number of times, said trapping means.

In one embodiment, the predictable result is a reference value in the device memory.

In a particular embodiment, said trapping means consists in reading and writing operations of at least one reference value into the device memories.

In an alternative embodiment, said trapping means makes operations on at least one reference value.

In one embodiment, said sensitive process consists of one manipulation (reading, writing, computing, conditional branching) of sensitive or secret data.

Finally, said sensitive or secret data are data contained in the card and must not be modified by a direct access from the outside world.

In another embodiment, said sensitive or secret data are data contained in the card and must not be revealed to the outside world.

The invention also relates to an architecture for the implementation of the method comprising a central processing unit and a hardware sensor distinct from said central processing unit, said hardware sensor being sensitive to said perturbations and supplying, in the absence of perturbation, a predictable result.

In one embodiment, the architecture further includes at least one command associated with said central processing unit.

The invention also relates to a chip card for the implementation of the method, including memory means storing the computer code, processing means for executing said computer code, executing the sensitive process and the redundant procedure and executing the trapping means between the execution of the process and the procedure.

The invention will be better understood while reading the description, given hereinafter as an explanation only, of an embodiment of the invention, while referring to the appended Figures.

Figure 1:
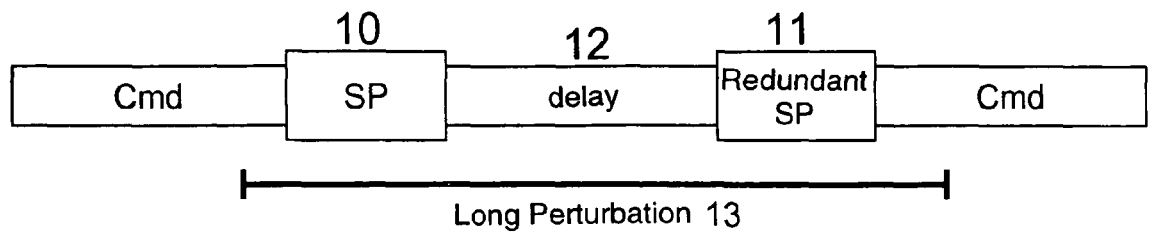
FIG. 1 illustrates the closest solutions of the prior art.
Figure 2:
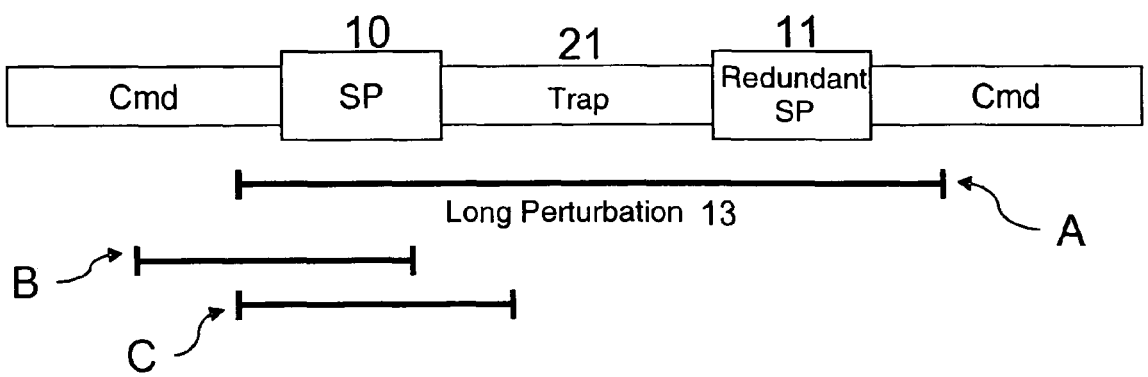
FIG. 2 illustrates the solution implemented by the present invention.

While referring to FIG. 2, the long perturbation 13 affects a command Cmd and more particularly the sensitive process 10 and/or the redundant procedure 11 which can be implemented according to a solution of the prior art. A sensor 21 of the trapping type is inserted between the execution of the sensitive process and the execution of the redundant procedure.

If the perturbation 13 does not overlap more than one part of the sensitive process (or the redundant procedure) and not the trap (B), the trap will not detect the perturbation and thus the possibility of a fault, but the sensitive process 10 and the redundant procedure 11 will be different and will make it possible to detect the fault.

If the perturbation 13 also partially overlaps the trap 21 (C), depending on its implementation, the latter will be able to detect the presence of the long perturbation 13.

Finally, if the perturbation 13 encloses both the sensitive process 10 and the redundant procedure 11, as well as the trap (A), the process 10 and the procedure 11 may not detect the attack, in which case the trap 21 will detect this perturbation 13.

Trapping means means supplying a predictable or predetermined result, independently from the other parameters used by the global electronic component and sensitive to external parameters affecting the produced result. The trapping sensor 21 is sensitive to perturbations 13 and supplies, in the absence of perturbations, a predictable or even a constant result. If the result is different, a fault/perturbation has been detected.

This trapping sensor can be implemented with a software by a piece of a code. In assembly language, the sensor can consist of the following suite of pseudo codes:

```
Trap:
    load ptr, #nvm_addr_ref1
    load R1, @ptr
    store @ram1, R1
    load R2, @ram1
    load ptr, #nvm_addr_ref2
    load R3, @ptr
    add R2, R3
    cmp R2, #res
    beq no_fault
    jmp fault_detection
no_fault:
    ret
``` load ptr, #nvm_addr_ref1 makes the loading in the register ptr of the address of reference ref1 into the non volatile memory nvm, load R1, @ptr loads the register R1 with the contents pointed by the pointer ptr (ref1 value), store @ram1, R1 writes the contents of R1 at a ram1 address, load R2, @ram1 reads the ram1 address and transfers the contents into the register R2, load ptr, #nvm_addr_ref2 loads the address of ref2 into nvm, in the register ptr, load R3, @ptr loads the register R3 with the contents pointed by the pointer ptr (ref2 value), add R2, R3 adds R2 with R3 in R2 (=ref1+ref2), cmp R2, #res compares R2 with res=ref1+ref2, beq no_fault comes out of the trap and takes over the execution of the program in the case of an expected result, jmp fault_detection: if R2 is different from the expected value #res, then the program jumps to a fault processing routine.

A fault whose effect is to modify a data during the execution of the Trap code is very likely to be detected, since the final result in R2 will be different from the expected hardware predefined value in the code (#ref).

A software sensor 21 of the trap type consists in manipulating data and making operations on known variables. The perturbation applied by the hacker has the effect of modifying at least one of the data or variables used in the trap, which leads to an unexpected result.

Finally, the sensor 21 can be implemented in hardware mode, for example by using a photosensitive sensor during the time interval between the sensitive process 10 and the redundant procedure 11. If the electrical power supplied by the photosensitive sensor exceeds a predefined threshold, then a light perturbation has been detected.

A small hardware module can also be operated in parallel with the CPU or in series and make operations with a predetermined result, with an aim of detecting a fault during its execution.

Several integrations of the trap 21 between the process 10 and the procedure 11 are possible:

- the trap is executed immediately after the sensitive process 10,
- the redundant procedure 11 is executed immediately after the trap,
- the delay between the process 10 and the procedure 11 is determined in a random way and the trap is executed during this delay,
- the trap is executed after a random delay following the sensitive process 10. The duration of the execution of the trap is thus unpredictable.
- the trap is executed a random number of times, which can thus constitute the interval between the process and the procedure. The duration of the execution of the trap is thus made unpredictable.

Figure 3:
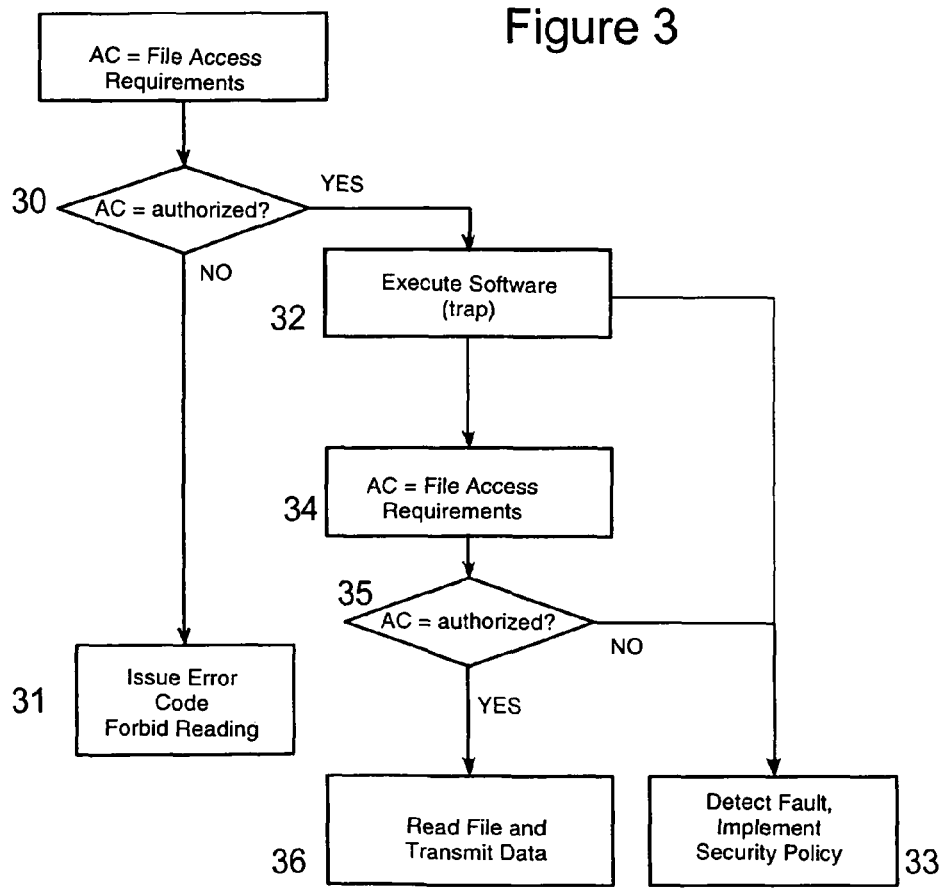
FIG. 3 illustrates an exemplary use of the present invention.

As an example, FIG. 3 illustrates the use of the invention within the frame of a reading access of a data file. Access requirements AC are issued 30 when the user requests the opening of the file.

If the access requirements are not met, an error code is issued 31 by the access requirements checking routine. This error code forbids any reading of the requested file.

If the access requirements are met, a trapping software sensor 32 is executed for some time. When the sensor detects a fault according to the invention, it implements a reaction 33 according to the prevailing safety policies, and the reaction prohibits access to the file.

If the software sensor has detected nothing at the timeout, the access requirements AC for the file 34 is re-examined 35, and detects a fault and implements a safety policy 33 if the access data have been modified by the hacker or authorizes 36 the reading of the file and the transmission of the data if the requirements are met again.

The invention claimed is:

1. A method for the detection of fault by perturbations during the execution of a computer code in an electronic device, said computer code comprising a sensitive process, the method including the steps of:
    - executing a redundant procedure of said sensitive process of the computer code;
    - inserting a delay between the sensitive process of the computer code and the redundant procedure;
    - executing a trapping means during said delay, said trapping means being sensitive to said perturbations and supplying, in the absence of perturbations, a predictable result.

2. A method according to claim 1, wherein said trapping means is a software sensor.

3. A method according to claim 1, wherein said trapping means is a hardware sensor.

4. A method according to claim 1, wherein said inserted delay is randomly determined.

5. A method according to claim 1, wherein said trapping means inserted is executed after a random latency.

6. A method according to claim 1, wherein said step of executing the trapping means comprises executing said trapping means a random number of times.

7. A method according to claim 1, wherein the predictable result is a reference value in a memory of the device memory.

8. A method according to claim 1, wherein said trapping means comprises reading and writing operations of at least a reference value from/into memories of the device.

9. A method according to claim 1, wherein said trapping means performs operations on at least one reference value.

10. A method according to claim 1, wherein said sensitive process comprises the manipulation of secret data.

11. A method according to claim 10, wherein said secret data are data contained in the electronic device and prohibited from being modified by a direct access from the outside world.

12. A method according to claim 11, wherein said secret data are data contained in the electronic device and prohibited from being revealed to the outside world.

13. An architecture for the implementation of the method according to claim 3, including a central processing unit and said hardware sensor, wherein said hardware sensor is distinct from said central processing unit, said hardware sensor being sensitive to said perturbations and supplying, in the absence of perturbation, a predictable result.

14. An architecture according to claim 13, further including at least timing associated with said central processing unit.

15. A chip card for the implementation of the method according to claim 1, including memory means storing the computer code, processing means for executing such computer code, executing the sensitive process and the redundant procedure and executing a trapping means between the execution of the process and the procedure.

* * * * *